US012105237B2

(12) United States Patent
Baines et al.

(10) Patent No.: US 12,105,237 B2
(45) Date of Patent: Oct. 1, 2024

(54) METHOD FOR GENERATING A GEOLOGICAL AGE MODEL FROM INCOMPLETE HORIZON INTERPRETATIONS

(71) Applicant: Landmark Graphics Corporation, Houston, TX (US)

(72) Inventors: Graham Baines, Oxfordshire (GB); Yikuo Liu, Reading (GB); Daniel Possee, Oxfordshire (GB)

(73) Assignee: Landmark Graphics Corporation, Houston, TX (US)

( * ) Notice: Subject to any disclaimer, the term of this patent is extended or adjusted under 35 U.S.C. 154(b) by 423 days.

(21) Appl. No.: 17/537,143

(22) Filed: Nov. 29, 2021

(65) Prior Publication Data

US 2022/0390634 A1    Dec. 8, 2022

Related U.S. Application Data

(60) Provisional application No. 63/197,180, filed on Jun. 4, 2021.

(51) Int. Cl.
    *G01V 1/30*    (2006.01)
    *G01V 1/34*    (2006.01)
(52) U.S. Cl.
    CPC .............. *G01V 1/301* (2013.01); *G01V 1/345* (2013.01)
(58) Field of Classification Search
    CPC .................................. G01V 1/301; G01V 1/345
    See application file for complete search history.

(56) References Cited

U.S. PATENT DOCUMENTS

| 8,213,261 B2 | 7/2012 | Imhof et al. |
| 8,447,525 B2 * | 5/2013 | Pepper ................ G01V 1/282 |
| | | 702/11 |

(Continued)

FOREIGN PATENT DOCUMENTS

| CN | 106707339 A | * | 5/2017 |
| GB | 2592203 A | | 8/2021 |

(Continued)

OTHER PUBLICATIONS

Paumard, et al.; "Full-volume 3D seismic interpretation methods: A new step towards high-resolution seismic stratigraphy"; Interpretation; vol. 7, No. 3; Jul. 3, 2019; 15 pgs.

(Continued)

*Primary Examiner* — Mohamed Charioui
*Assistant Examiner* — Lynda Dinh
(74) *Attorney, Agent, or Firm* — Michael Jenney; Parker Justiss, P.C.

(57) ABSTRACT

In contrast to existing methods wherein derived horizons are interpreted in isolation, the disclosure provides a process that does not interpret patches themselves but determines the relationships between patches, in order to associate and link patches to derive a holistic geological interpretation. Predefined patches, such as from a pre-interpreted suite, are received as inputs to determine the relationships and derive an interpretation for a complete volume. In one aspect the disclosure provides an automated method of generating a geological age model for a subterranean area. In one example, the automated method includes: (1) abstracting seismic data of a subsurface into a limited number of patches, (2) abstracting the patches by defining patch-links between the patches, and (3) generating a geological age model of the subsurface by solving for the relative geological age of each of the patches using the patch-links.

20 Claims, 4 Drawing Sheets

(56) References Cited

U.S. PATENT DOCUMENTS

| | | |
|---|---|---|
| 8,566,069 B2 | 10/2013 | Pauget et al. |
| 9,759,826 B2 | 9/2017 | Mallet et al. |
| 2008/0140319 A1* | 6/2008 | Monsen ................ G01V 11/00 |
| | | 702/16 |
| 2011/0246157 A1 | 10/2011 | Pauget et al. |
| 2013/0138351 A1 | 5/2013 | Fink |
| 2018/0306938 A1* | 10/2018 | Gesbert ................... G01V 1/34 |
| 2023/0093005 A1* | 3/2023 | Lowell ................... G01V 1/345 |
| | | 703/6 |

FOREIGN PATENT DOCUMENTS

| | | |
|---|---|---|
| WO | 2018065684 A1 | 4/2018 |
| WO | 2019236078 A1 | 12/2019 |

OTHER PUBLICATIONS

Pauget, et al.; "A Global Approach in Seismic Interpretation Based on Cost Function Minimization"; SEG Technical Program Expanded Abstracts; 2009; 4 pgs.

* cited by examiner

METHOD FOR GENERATING A GEOLOGICAL AGE MODEL FROM INCOMPLETE HORIZON INTERPRETATIONS

CROSS-REFERENCE TO RELATED APPLICATION

This application claims the benefit of U.S. Provisional Application Ser. No. 63/197,180, filed by Graham Baines, et al. on Jun. 4, 2021, entitled "A METHOD FOR GENERATING A GEOLOGICAL AGE MODEL FROM INCOMPLETE HORIZON INTERPRETATIONS," commonly assigned with this application and incorporated herein by reference in its entirety.

BACKGROUND

Oil and gas companies often use seismology for subterranean exploration. Seismology exploration includes generating seismic waves to map subsurface structures. The seismic waves propagate from a source down into the earth and reflect from boundaries between subsurface structures. Receivers detect and record the reflected seismic waves, which can be saved as datasets. A seismic interpretation workflow is often used to process the datasets.

A time-consuming and challenging part of the seismic interpretation workflow is the extraction of seismic horizons from the dataset. The horizons not only characterize the structure of the subsurface, but also represent surfaces of uniform geological time during the deposition of sediments. Because of more advanced workflows such as reservoir characterization and stratigraphic studies, there is often a need to extract large numbers, such as a 100 or more, of seismic horizons from any given dataset, and to determine the relationships between these horizons.

SUMMARY

In one aspect, the disclosure provides an automated method of generating a geological age model for a subterranean area. In one example, the automated method includes: (1) abstracting seismic data of a subsurface into a limited number of patches, (2) abstracting the patches by defining patch-links between the patches, and (3) generating a geological age model of the subsurface by solving for the relative geological age of each of the patches using the patch-links.

In another aspect, the disclosure provides a computer program product having a series of operating instructions stored on a non-transitory computer-readable medium that directs a data processing apparatus when executed thereby to perform operations to generate a geological age model from a pre-interpreted suite of patches. In one example the operations include: (1) abstracting seismic data of a subsurface into a limited number of patches, (2) abstracting the patches by defining patch-links between the patches, and (3) generating a geological age model of the subsurface by solving for the relative geological age of each of the patches using the patch-links.

In yet another aspect, the disclosure provides an apparatus including at least one processor and memory, the memory including computer program code, the memory and the computer program code configured to, with the at least one processor, cause the apparatus to automatically generate a geological age model from a pre-interpreted suite of patches by performing at least the following: (1) abstracting seismic data of a subsurface into a limited number of patches, (2) abstracting the patches by defining patch-links between the patches, and (3) generating a geological age model of the subsurface by solving for the relative geological age of each of the patches using the patch-links.

BRIEF DESCRIPTION

Reference is now made to the following descriptions taken in conjunction with the accompanying drawings, in which.

DETAILED DESCRIPTION

Figure 1:
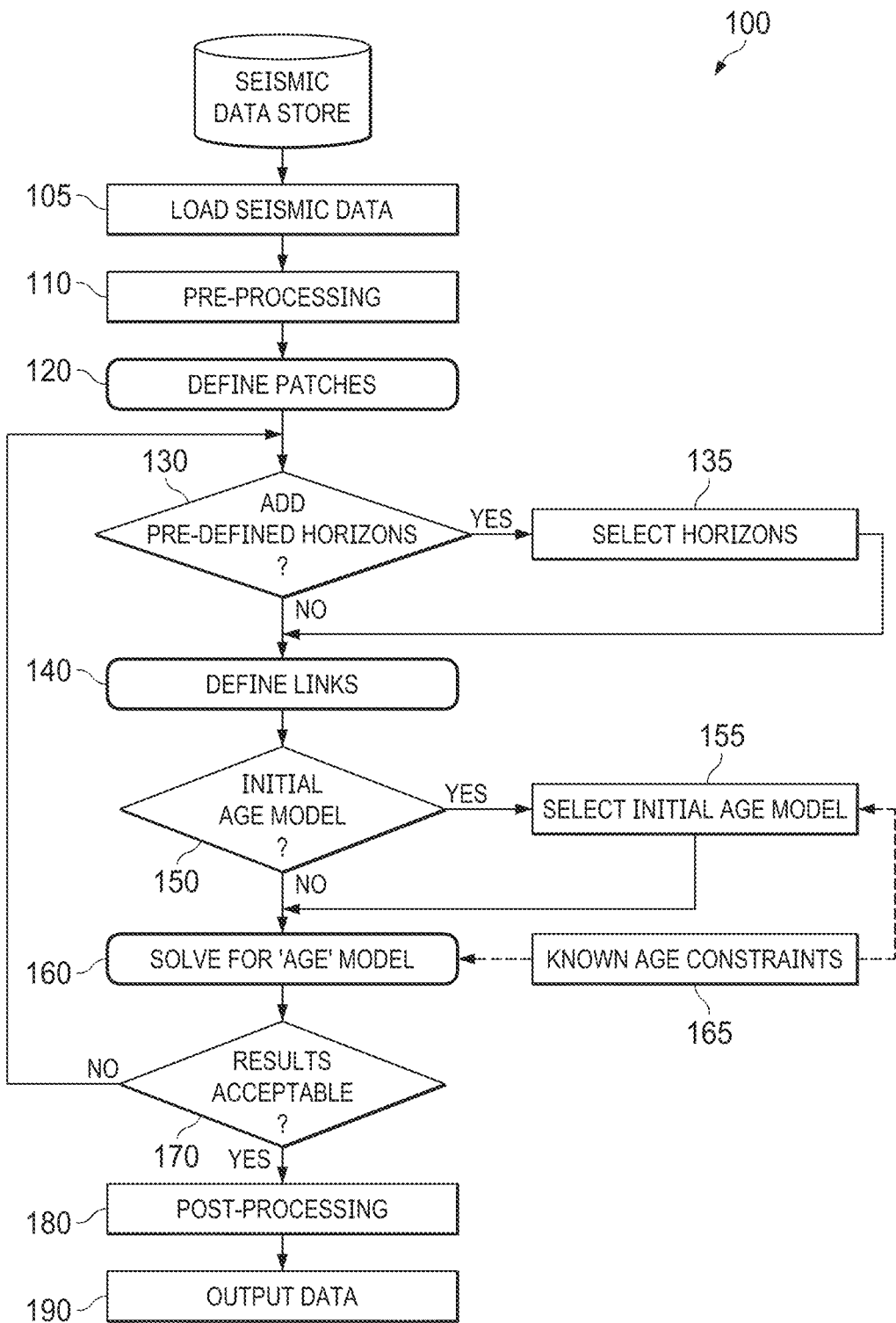
FIG. 1 illustrates a flow diagram of an example of a workflow for horizon interpretation in seismic data carried out according to the principles of the disclosure.

Various tracking algorithms are often used to track horizons in a seismic dataset. The conventional tracking algorithms, however, are unable to track a seismic horizon throughout a volume due to lateral heterogeneity along a horizon, structural complexity or noise. As such, a suite of disconnected sub-horizons, or patches, are usually the result.

In contrast to existing methods wherein derived horizons are interpreted in isolation, the disclosure provides a process that does not interpret patches themselves but determines the relationships between patches, in order to associate and link patches to derive a holistic geological interpretation. Pre-defined patches, such as from a pre-interpreted suite, are received as inputs to determine the relationships and derive an interpretation for a complete volume.

This disclosure describes an automated method for defining the relationships between these patches, which allows the construction of a geological age model from the patches. The method relates to a component of a seismic workflow for the interpretation of subsurface geological horizons from processed seismic data. The seismic data can be reflection data. The features disclosed herein can also be applied to interpretation of ground penetrating radar, or seismic data from other methods that can be used to interpret sedimentary layers in a subsurface. The method constructs a geological age model from a pre-interpreted suite of incomplete sub-horizons (patches), which may also include a number of complete horizons.

The method includes determining relative geological ages for the patches, such as for each of the patches, which are constrained by patch-links that associate patches based on spatial-temporal relationships defined according to geological principles. For example, the relationships can be that one patch is older than another, or that a pair of patches are likely to be the same age. The geological age model is achieved by interpolating the patch ages onto a grid, wherein the final output can be a Relative Geological Time (RGT) volume. The method allows the addition of known a priori constraints, e.g., well-ties, to quickly arrive at a solution, which can be part of a modular workflow. Additionally, the creation and storage of inter-patch definition of links provides the options for direct user interaction.

The disclosed method has the benefits of abstracting a seismic volume to a limited number of patches and then further abstracting the geometry of the patches to a subset of spatial and geological relationships between those patches, which can be accomplished by defining the patch-links. Abstracting is reducing the data to a simplified representation of the whole, such as a process of removing characteristics to reduce the data to a set of essential characteristics.

Any number of patch-links can be added to constrain the relationships between patches. For example, the method allows the incorporation of constraints from well-data, previous interpretations or other observations such that the age-volume can be calibrated. The method also allows the ready incorporation of faults and other geological complexities. The method generates solution matrices that can be solved to provide the geological age models. The solution matrices are square matrices with dimensions of the number of patches.

FIG. 1 illustrates a flow diagram of an example of a workflow 100 for horizon interpretation in seismic data carried out according to the principles of the disclosure. The workflow 100 solves for a global age model from an unlinked suite of patches. The workflow uses the geological principle of super-position and the assumption that horizons get older with depth, such that if a patch overlies another then the upper patch is younger than the lower patch.

At least a portion of the workflow 100 can be automated. At least a portion of workflow 100 can represent an algorithm or algorithms and be encapsulated in software code or in hardware, for example, an application, a code library, a dynamic link library, a module, a function, a RAM, a ROM, and other software and hardware implementations. The software can be stored in a file, database, or other computing system storage mechanism. The software can be stored on a non-transitory computer readable medium. At least a portion of the workflow 100 can be partially implemented in software and partially in hardware. A processor can be directed to perform operations according to the algorithms. For example, processor 430 of the seismic data evaluator 400 of FIG. 4 can be configured to perform, such as automatically perform, some of the steps of the workflow 100. Various equations are noted in the following discussion of the workflow 100 as examples for performing some of the steps of the workflow 100. The algorithms can correspond to one or more, including all, of the equations.

Figure 3A:
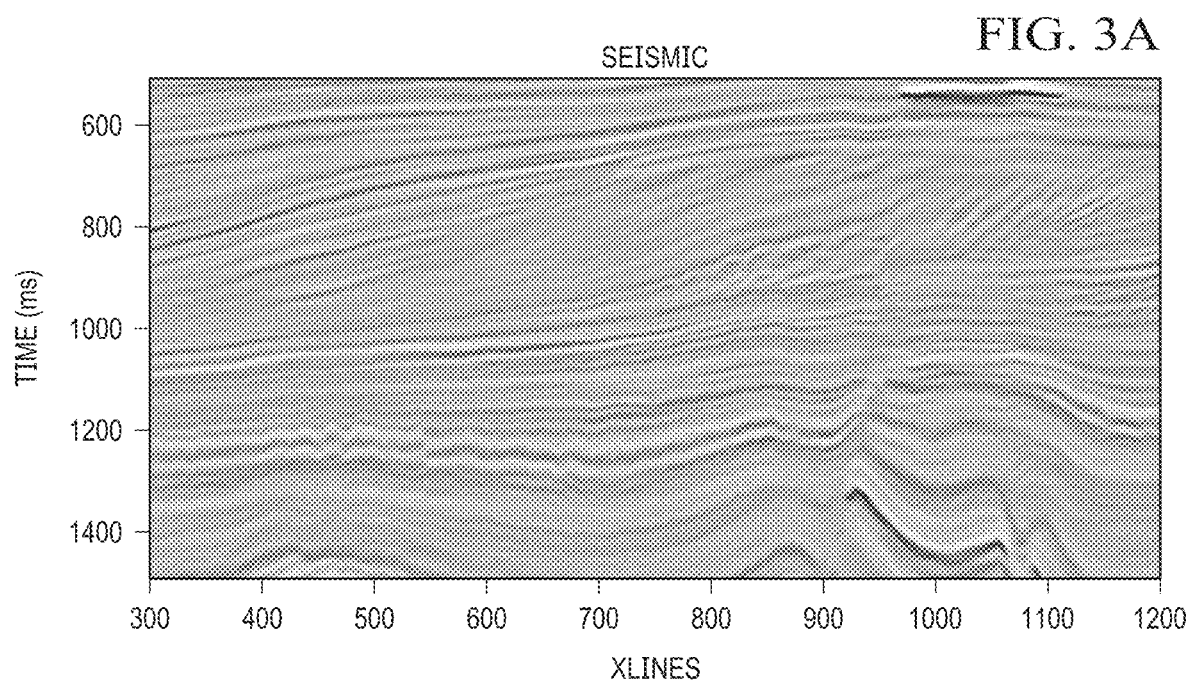
FIG. 3A illustrates a diagram of an example of seismic data from a subterranean area.

The workflow 100 begins by receiving seismic data in step 105. As shown in FIG. 1, the seismic data can be received from a seismic data store. The seismic data can be seismic reflection data. The seismic data can be 3D data. The seismic data can also be 4D data that would typically include two or more 3D surveys shot at different times. The disclosed technique can be applied to each of the two or more 3D datasets independently. FIG. 3A provides an example of seismic data that is received. The seismic data of FIG. 3A is a 2D inline section of 3D seismic data.

In step 110, the seismic data is pre-processed to generate a pre-interpreted suite of patches. The seismic data can be cleaned-up in step 110. Conventional processing methods can be used to generate a pre-interpreted suite of patches.

The resulting seismic data can also include horizons with the pre-interpreted suite of patches.

Figure 3B:
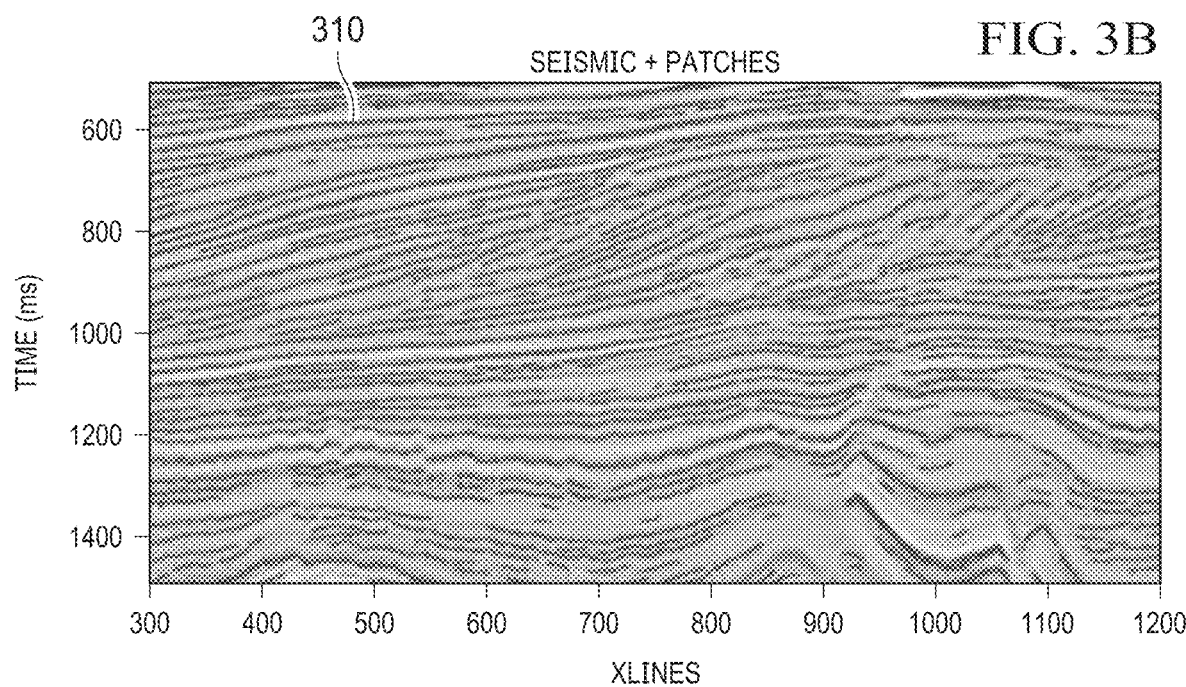
FIG. 3B illustrates a diagram showing a suite of interpreted patches from the seismic data of FIG. 3A after pre-processing.

Patches are defined from the pre-processed seismic data in step 120. The patches can be defined via conventional procedures. FIG. 3B illustrates an example of a suite of interpreted patches from the seismic data of FIG. 3A after pre-processing. In FIG. 3B, the patches are represented in black. A single patch 310 is identified as an example.

A determination is made in step 130 if there are pre-defined horizons to add to the interpreted seismic data. If there are, the workflow 100 continues to step 135 where the pre-defined horizons are selected and added to the pre-interpreted seismic data. The pre-defined horizons can be selected from a data repository, such as the seismic data store. Selection and adding of the pre-defined horizons can be performed manually or automatically. The pre-defined horizons can be known horizons and a correlation of these horizons with the interpreted seismic data can be determined automatically by a processor or manually by one skilled in the art. A match can be based on depth/TWT for pre-existing patches. For example, if the pre-processed patch coincides with (i.e. duplicates) some or all of a 'known horizon', the patch could be removed as the data are redundant. If a patch crosses a known horizon, several options exist: 1) the patch could be split by the 'known horizon'; 2) the patch could be removed, 3) the patch could be flagged for quality assurance or quality control.

After step 135, the workflow 100 continues to step 140 and patch-links are defined.

Additionally, if there are no pre-defined horizons to add, the workflow 100 continues to step 140. As noted above, the workflow 100 solves for a global age model from an unlinked suite of patches using the geological principle of super-position and the assumption that horizons get older with depth. Solving for the global age model includes defining relationships or patch-links between the unlinked patches. Patch-links are used to set-up n-simultaneous equations that calculate the depositional rate between superposed patches, such as represented by Equation 1.

$$d_{ijk} = \frac{z_{jk} - z_{ik}}{a_j - a_i} 1 \qquad \text{Equation 1}$$

where $z_{jk}$ is the depth to path j for link k, $a_j$ is age of patch j, and $d_{ijk}$ is the relative depositional rate between patch i and patch j for link k, such that $z_{jk} > z_{ik}$.

To solve for relative geological age Equation 1, for example, can be rearranged into matrix form as represented by Equation 2.

$$\left[\frac{1}{d_{ijk}}\right] = \left[\frac{-1}{\Delta z_{ijk}} \quad \frac{1}{\Delta z_{ijk}}\right]\left[\begin{array}{c}a_i \\ a_j\end{array}\right] \qquad \text{Equation 2}$$

where $\Delta z_{ijk} = z_{jk} - z_{ik}$.

An overdetermined system of equations from n links between patches can then built represented, for example, by Equation 3.

$$\vec{s} = L \vec{a} \qquad \text{Equation 3:}$$

where $\vec{s}$ is a n by 1 vector of the inverse of depositional rate (depositional slowness) between horizons such that $$s_k = \left[\frac{1}{d_{ijk}}\right].$$

L is an n by m matrix, whose entries are defined by the inverse of the distance between horizons. $\vec{a}$ is a m by 1 vector of the age of horizon path.

Figure 2:
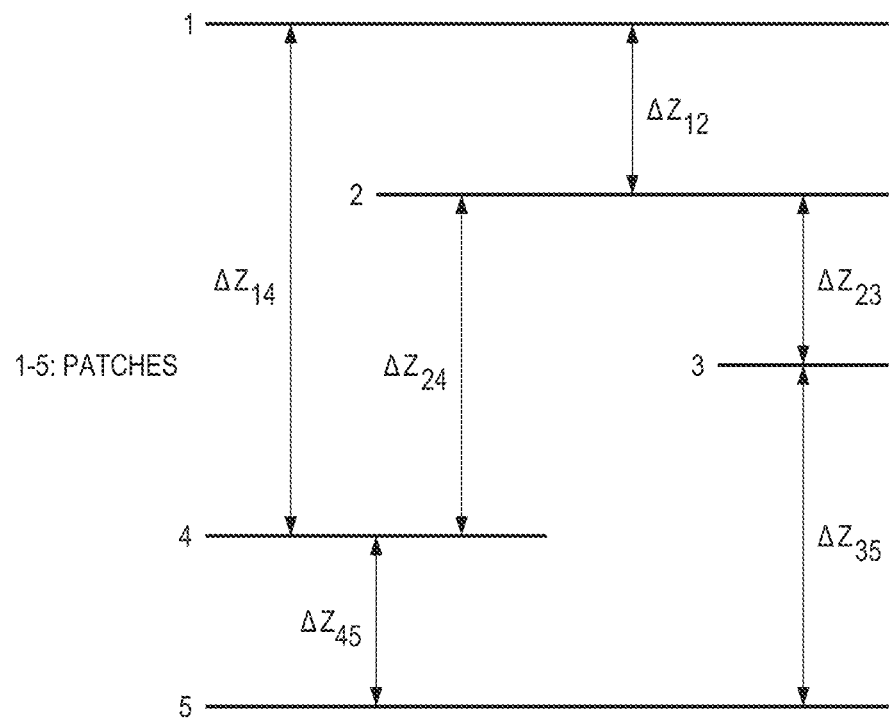
FIG. 2 illustrates a diagram that provides a visual example of defining links between patches according to the principles of the disclosure.

The links between patches can be defined a variety of ways, but the intent is to define one or more links from each patch to a patch directly below or above it. Several strategies could be employed, including but not limited to: On a regular grid of x, y, locations, determine the intersection of patches in the vertical axis (time or depth) and define patch-links between all vertically adjacent patches at a location. For each patch, extract links by searching for the nearest patch and continue to process through the grid to cover the various locations of the grid. FIG. 2 provides a visual example that shows five patches and links defined between them. An example of an L matrix from Equation 3 for the patches shown in FIG. 2 is given in Equation 4.

$$\vec{s} = \begin{bmatrix} -0.33 & 0 & 0 & 0.33 & 0 \\ -1 & 1 & 0 & 0 & 0 \\ 0 & -1 & 1 & 0 & 0 \\ 0 & -0.5 & 0 & 0.5 & 0 \\ 0 & 0 & 0 & -1 & 1 \\ 0 & 0 & -0.5 & 0 & 0.5 \end{bmatrix} \vec{a} \quad \text{Equation 4}$$

Instead of an x, y, rectangular grid, other grids can also be used, such as a triangular grid or an arrangement of patch sizes.

Figure 3C:
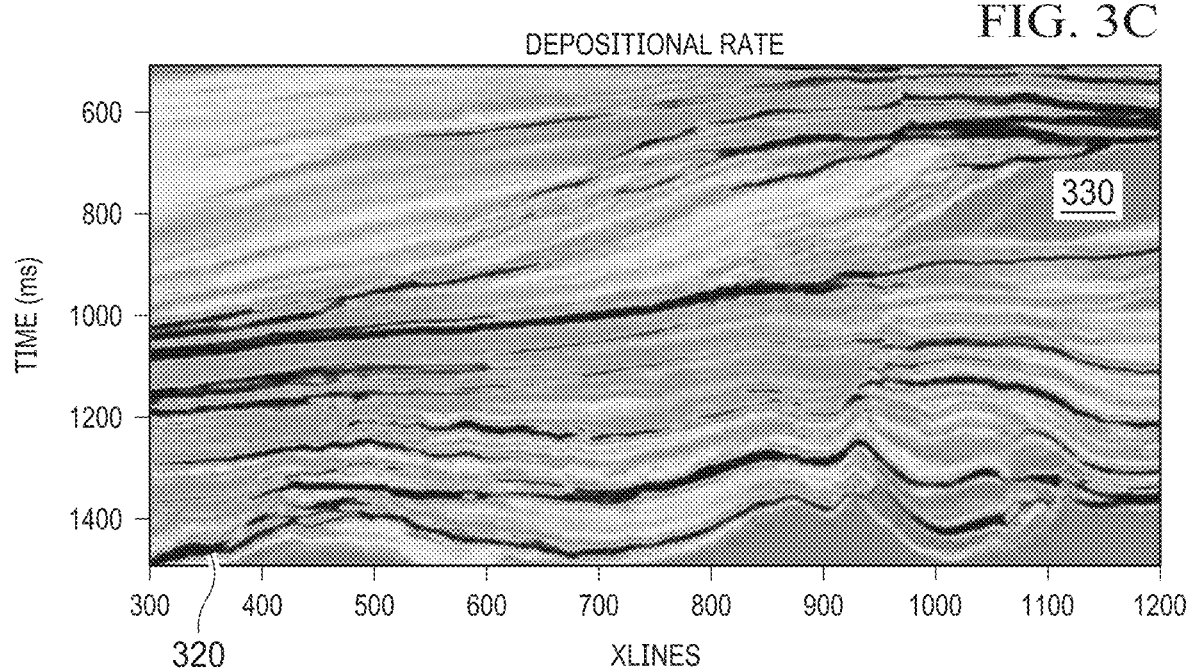
FIG. 3C illustrates a diagram providing an example of an initial depositional rate model automatically created from pre-processed seismic data of FIG. 3B.

With defined patch-links, the workflow 100 continues to step 150 where the decision to include an initial age model is made. If an initial age model is not to be used, the workflow 100 continues to step 150, and a constant initial depositional rate is specified, as an initial condition. If an initial age model is to be included than the workflow continues to step 155 and one is selected. The initial age model can be defined based on historical data. Other known methods can be used to select or define the initial age model. The initial age model can be used directly or used to define an initial depositional rate mode (by extracting the vertical gradient of the age model for each patch-link). FIG. 3C represents an initial depositional rate model. FIG. 3C illustrates an initial depositional rate model calculated by approximating a "stream function" from seismic dip. In FIG. 3C, slow areas are denoted in black and fast depositional areas are denoted in dark blue. A slow depositional area 320 and a fast depositional area 330 are identified in FIG. 3C as examples.

After steps 150 and 155, the workflow 100 continues to step 160 where the geological age model is iteratively solved. The depositional slowness vector or the age vector in Equation 3, for example, is unknown but can be solved iteratively by assuming either an initial age model or slowness vector using Equations 4 and Equation 5. Typically, $\vec{s}$ and $\vec{a}$ are unknown and an iterative solution is needed. Assuming, for example, a starting model $\vec{s_0}$ such as a constant, then for iteration p $$\vec{\vec{q}}_p = (L^T L + \gamma I)^{-1} L^T \vec{\vec{s}}_{p-1} \quad \text{Equation 5:}$$

and $$\vec{\vec{s}}_p = \vec{\vec{s}}_{p-1} + \varepsilon (L \vec{\vec{q}}_p - \vec{\vec{s}}_{p-1}) \quad \text{Equation 6:}$$

where $\gamma$ is a regularization parameter, set to a negligibly small value so that L is not singular. I is the identity matrix and $\varepsilon$ defines the rate of convergence such that $0<\varepsilon>1$.

Figure 3D:
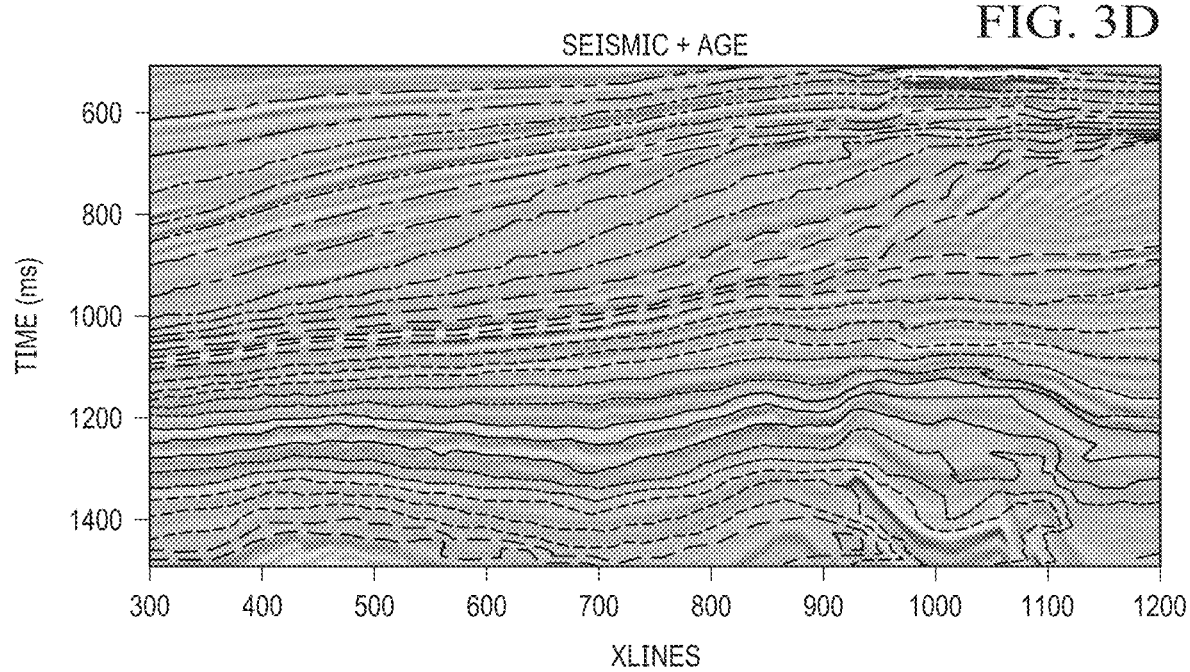
FIG. 3D illustrates a diagram of an example of a geological age model obtained according to the principles of the disclosure.

An example of a trivial approach is to set a constant initial slowness, solve for the age of the patches, using Equation 5, update the initial slowness vector using Equation 6 and repeat until solutions converge. For well-posed problems convergence is rapid. FIG. 3D provides an example of a geological age model generated by step 160.

As written, Equations 5 and 6 do not guarantee that the principle of superposition, i.e., a positive depositional rate, is enforced. This condition can be added as a constraint, such that $\vec{s_k} > 0$; where k=1,2, ..., m. This constraint can be implemented by replacing any negative values $\vec{s_k} < 0$ with relatively large value (e.g., a value of two times the initial (or average) depositional slowness, typically yields good results), or by modifying Equation 5.

Boundary conditions, such as fixed age constraints, can also be used when defining the patch-links in step 140 to assist solving in step 160. For example, in Equation 3, L is singular, addition of a negligible regularization parameter in Equation 5 allows the model to be solved but will lead to a zero-mean age for the patches. More geologically sensible results can be obtained by adding one or more boundary condition. In a simple example, the age of the horizon can be fixed using Equations 7-10.

$$\vec{s}_{n+1} = a_0. \quad \text{Equation 7:}$$

$$L_{(n+1)i} = 1. \quad \text{Equation 8:}$$

$$L_{(n+1)j} = 0, \text{ where } j \neq i. \quad \text{Equation 9:}$$

The incorporation of one or more boundary conditions, can remove the need for the regularization term in Equation 5, if boundary conditions are set such that L is non-singular. By analogy to a directed graph, where the patches are nodes and patch-links are edges, this requires that all connected components of the graph have a boundary condition set.

Multiple boundary conditions can be set, for example if certain interpreted horizons or patches have been assigned a geological age based on external geological knowledge, or if there is an age calibrated well tied to the seismic data, then these known constraints can be incorporated in the solution as additional boundary conditions.

In such cases, to ensure a consistent age model solution across the volume the initial depositional slowness model used in Equation 5 can be scaled. This can be achieved by applying a constant value that is equivalent to the average depositional slowness inferred from the boundary conditions.

An alternative solution can use known constraints to define an initial age model for the patches and then use Equation 3 to define an initial slowness model. The initial age model could be defined by interpolating between known constraints to define an apriori age volume and then assign an age for each patch by sampling this age volume.

Manual or automated age equivalence of patches can also be used when defining the patch-links in step 140. The approach of vertical superposition can determine the relative geological ages for disconnected patches that are superposed and sub-parallel. However, for discontinuous, folded and/or faulted horizons or where thicknesses vary significantly, e.g., clinoforms, sometimes the method is less able to constrain the lateral equivalence of patches.

Equation 10 provides an example of the system of equations based on FIG. 2 if path 1 is known to be 0 Ma and patch 5 is known to be 20 Ma.

$$\begin{bmatrix} s_1 \\ s_2 \\ s_3 \\ s_4 \\ s_5 \\ s_6 \\ 0 \\ 20 \end{bmatrix} = \begin{bmatrix} -0.33 & 0 & 0 & 0.33 & 0 \\ -1 & 1 & 0 & 0 & 0 \\ 0 & -1 & 1 & 0 & 0 \\ 0 & -0.5 & 0 & 0.5 & 0 \\ 0 & 0 & 0 & -1 & 1 \\ 0 & 0 & -0.5 & 0 & 0.5 \\ 1 & 0 & 0 & 0 & 0 \\ 0 & 0 & 0 & 0 & 1 \end{bmatrix} \vec{a} \quad \text{Equation 10}$$

Many methods can be used to determine if two patches are age-equivalent. Adding patch-links automatically can include extrapolation between patches and intersections e.g., based on local structural dips, Dynamic time-warping, and Deep learning approaches e.g., horizon tracking using a CNN. Regardless of the method used to define if two patches are equivalent, their incorporation into the least-squares solution for a global age model can be performed via various ways, including the options of soft-constraints and hard-constraints. For soft constraints, a link between the patches is added in a similar way to vertical links, such that patches are encouraged, but not forced, to have the same age. Using this approach it is possible to weight the constraint. i.e., add a link with the format shown by $$0 = \begin{bmatrix} -w & w \end{bmatrix} \begin{bmatrix} a_i \\ a_j \end{bmatrix}. \quad \text{Equation 11}$$

Equation 12 shows the system of equations that results from adding a constraint that horizons 3 and 4 of FIG. 2 are known to have equivalent ages.

$$\begin{bmatrix} s_1 \\ s_2 \\ s_3 \\ s_4 \\ s_5 \\ s_6 \\ 0 \\ 20 \\ 0 \end{bmatrix} = \begin{bmatrix} -0.33 & 0 & 0 & 0.33 & 0 \\ -1 & 1 & 0 & 0 & 0 \\ 0 & -1 & 1 & 0 & 0 \\ 0 & 0.5 & 0 & 0.5 & 0 \\ 0 & 0 & 0 & -1 & 1 \\ 0 & 0 & 0.5 & 0 & 0.5 \\ 1 & 0 & 0 & 0 & 0 \\ 0 & 0 & 0 & 0 & 1 \\ 0 & 0 & -w & w & 0 \end{bmatrix} \vec{a} \quad \text{Equation 12}$$

Equation 11 provides an example of a soft constraint. With hard-constraints, for the purposes of solving the matrix, the patches are merged such that all the patch-links for one of the patches are applied to the equivalent patch and a condition applied that forces identical ages for the patches. For example, if patch i and j are known to have identical ages, matrix L can be adjusted using, for example, Equation 13 and a constraint can be added as shown by Equation 14.

$$L_{ki} = L_{ki} + L_{kj} \text{ and } L_{kj} = 0, \text{ for } k=1,2,\ldots,n \quad \text{Equation 13:}$$

A hard constraint can be added per $$[0] = \begin{bmatrix} -1 & 1 \end{bmatrix} \begin{bmatrix} a_i \\ a_j \end{bmatrix} \quad \text{Equation 14}$$

Equation 15 shows the system of equations that results from adding a constraint that horizons 3 and 4 of FIG. 2 are known to be the same age.

$$\begin{bmatrix} s_1 \\ s_2 \\ s_3 \\ s_4 \\ s_5 \\ s_6 \\ 0 \\ 20 \\ 0 \end{bmatrix} = \begin{bmatrix} -0.33 & 0 & 0.33 & 0 & 0 \\ -1 & 1 & 0 & 0 & 0 \\ 0 & -1 & 1 & 0 & 0 \\ 0 & 0.5 & 0.5 & 0 & 0 \\ 0 & 0 & -1 & 0 & 1 \\ 0 & 0 & 0.5 & 0 & 0.5 \\ 1 & 0 & 0 & 0 & 0 \\ 0 & 0 & 0 & 0 & 1 \\ 0 & 0 & -1 & 1 & 0 \end{bmatrix} \vec{a} \quad \text{Equation 15}$$

Automating age equivalence assignment can be performed via a trace-to-trace approach that takes two traces, identifies isolated patches (i.e., those that only exist on one of the traces), and extrapolates these isolated patches from each trace to a common location (e.g., the midpoint between traces). Extrapolation can be achieved by various methods, such as using patches present on both traces to define local trends for the extrapolation. Extrapolating based on the local trend of each isolated patch can be performed using a pre-calculated structural trend, for example a dip volume, stream function. The extrapolated position of the isolated patches can be used to define patch-links between patches that are not present on the same trace. It is also possible to extrapolate patches following some measure of local structural dip. These extrapolated patches can then be used to define additional vertical links in the same way as shown in FIG. 2 and used to construct a geological age model.

While constraints can be used when defining the patch-links in step 140 to assist the solving in step 160, various features can also be used to improve the solving of step 160. For example, to generate a smoother age model smoothing based on a minimum distance between two patches, Equations 16 and 17 can be imposed.

$$\vec{a}_p = (L^T L + \gamma I + wP)^{-1} L^T \vec{s}_{p-1} \quad \text{Equation 16:}$$

where w is the weight assigned to smoothing and the P matrix is a matrix of the inverse distances between patches such that $$P_{ij} = \frac{-1}{dist_{min}(i,j)} \text{ for } i \neq j \quad \text{Equation 17}$$

$$\text{and } P_{ii} = \sum_{j=1}^{m} \frac{1}{dist_{min}(i,j)} 0$$

Distances could be calculated using various methods, such as Euclidean distance, Manhattan distances or as a structurally weighted distance if distances parallel to structural dip are shorter than an equivalent spatial distance perpendicular to dip.

Normalization of patch-links can also be used for the solving of step 160. The least square solution of an age model minimizes the differences between the target and the derived depositional rate. Given the same relative difference, a greater value of depositional rate contributes more to the misfit function. To balance the contribution along the data vector, a weighting matrix can be applied to the solution. Equation 18 provides an example of a weighting vector that can be applied to Equation 3.

$$\vec{w} \cdot \vec{s} = (\vec{w} \text{ IL}) \vec{a} \quad \text{Equation 18:}$$

The weights can be determined by a negative power of the depositional slowness vector, if an initial depositional rate model is supplied. Alternatively, weights can be defined based on maximum values of rows in matrix L, such that the impact of each patch-link on the final solution is normalized.

Equations 19-21 provide examples of weighting to balance the contribution along the depositional rate vector. These examples are illustrative and not exhaustive, other weighting or combination of weights can be applied. A weighting matrix can be applied using, for example, Equations 19-21.

Regarding Equation 19, a weighting matrix W can be introduced.

$$W\vec{s}=WL\vec{a}$$

where W is a m by m diagonal matrix and its element $W_{ii}$ can be defined by $$W_{ii}=(s_i)^{-k} \quad \text{Equation 20:}$$

where k is a positive value to control the power of weighting. With the inclusion of W, the age vector can be solved per $$\vec{a}=(L^T W^T W L + w_1 I)^{-1} L^T W^T W \vec{s} \quad \text{Equation 21:}$$

such that the relative weighting among the data samples (depositional rate) can be controlled.

Linear constraints can also be included into the least square solution to guide the solution of age model. For example, the least square solution of the age vector $\vec{a}$ can be equivalent to minimizing the objective function represented by $$\varphi(\vec{a})=\|\vec{s}-L\vec{a}\|^2+w_1\|\vec{a}\|^2 \quad \text{Equation 22:}$$

where $w_1$ denotes the weighting of the regularization.

Equation 23 provides an example of considering the solution subject to a linear constraint.

$$\vec{b}=P\vec{a} \quad \text{Equation 23:}$$

where $\vec{b}$ is a n by 1 vector having the same size as $\vec{a}$, and P is a m by n matrix.

Such a linear constraint can be used to represent various or even any relationship of age as long as it is linear. For example, it can describe the equivalence of age among selected patches. For another example, it can be used to calculate the derivatives of age and compared to an external field, e.g., a structural tensor field, to ensure the consistency between the age model and the external metric field.

Equation 24 provides an example of the objective function with the inclusion of a linear constraint.

$$\varphi(\vec{a})=\|\vec{s}-L\vec{a}\|^2+w_1\|\vec{a}\|^2+w_2\|\vec{b}-P\vec{a}\|^2 \quad \text{Equation 24:}$$

where $w_2$ denotes the weighting of the linear constraint, and the value of $w_2$ determines the harshness of the constraint. For example, given the model as illustrated in FIG. 2, when horizon 3 and 4 are supposed to have the same age, the matric P can be represented by Equation 25 and vector $\vec{b}$ is a zero vector.

$$P = \begin{bmatrix} 0 & 0 & 0 & 0 & 0 & 0 \\ 0 & 0 & 0 & 0 & 0 & 0 \\ 0 & 0 & 1 & -1 & 0 & 0 \\ 0 & 0 & -1 & 1 & 0 & 0 \\ 0 & 0 & 0 & 0 & 0 & 0 \\ 0 & 0 & 0 & 0 & 0 & 0 \end{bmatrix} \quad \text{Equation 25}$$

The least square solution of $\vec{a}$ with respect to the constrained objective function can be represented by Equation 26 with the linear constraint as represented by Equation 2 applied.

$$\vec{a}=(L^T L+w_1 I+w_2 P^T P)^{-1}(L^T \vec{s}+w_2 P^T \vec{b}). \quad \text{Equation 26:}$$

Previously defined faults can also be incorporated into the solution. During patch creation the patches are truncated or split by faults. During or after the specification of vertical links between patches, any patch-links that cross a fault can be removed. Subsequently it may be necessary to add patch-links that define how horizons are linked across the fault, such patch-links can be defined automatically, e.g., based on dynamic time-warping on either side of the fault, or by manual input. But such links are unlikely to follow local structural dip.

Known age constraints can also be added to steps 155 and 160. The age constraints can be age-equivalent constraints including some of the constraints noted above with respect to step 140. For example, dynamic time-warping and deep learning approaches, such as horizon tracking using a CNN, can be incorporated into one or more of steps 155 and 160.

After step 160, a determination is made if the resulting geological age model is acceptable. Determining if the geological age model is acceptable can be determined manually or automatically. For manual determination, a quality assurance or quality control review of the geological age model can be performed. For example, manual review of FIG. 3D can be performed to determine acceptance. The geological age model can be provided to a display for a visual review. Automated and/or quantitative methods can also be used that analyze, for example, a misfit between the gradient of an interpolated age model and the local structural dip volume. The automated analysis can be relied upon to determine acceptance, or a user can use results from the automatic analysis to assist in manually determining acceptance.

If not acceptable, the workflow 100 returns to step 130. If acceptable, the workflow 100 continues to post-processing in step 180. The solution of the geological age model results in ages assigned to the patches themselves. In order to extract a consistent set of horizons throughout the volume, several options exist for post-processing including 3D interpolation of patch-ages to generate an age model, 3D structure guided interpolation, e.g. Dave Hale, (2009), "Image-guided blended neighbor interpolation of scattered data,"SEG Technical Program Expanded Abstracts: 1127-1131, which is incorporated herein by reference, grouping patches with similar ages and no overlap then interpolate, sequential dip-tracking of patches, and horizon optimization, e.g. Wu, X. & Hale, D., 2015, Horizon volumes with interpreted constraints, Geophysics, 80(2), IM21-IM33, which is incorporated by reference. Other methods of post-processing, such as conventional methods and procedures, can also be used.

In step 190, an output is provided from the processed geological age model. The output can be a Relative Geological Time (RGT) volume. The output provides an understanding of the subsurface geology and can be used to develop oil field models to identify and target hydrocarbon resources. The output can be used in a well operation, such as a drilling operation, wherein the output is used to identify the drilling location and drilling is performed at the location.

Using FIGS. 3A to 3D, an example of determining the relative geologic age using the proposed method is provided. For this example, a 3D seismic cube is used to demonstrate the utility of the method. The 3D seismic cube consists of 100 inlines (inline ID from 200 to 300), 900 crosslines (crossline ID from 300 to 1200), and a time window of 1000 ms (from 500 to 1500 ms), which is cropped from an example of an open-source 3D seismic dataset. The cross lines are on the x axis and the time is on the y axis of FIG. 3A that shows the original seismic data on a single inline section, inline 240.

From this seismic data, a suite of patches is automatically interpreted. Nodes are first selected by an automatic scan of seismic troughs. Edges are then generated between the nodes in order to form patches as represented in FIG. 3B. The edges could be generated by one or more different methods, for example using conventional tracking methods, dynamic time warping (DTW) or by dip-tracking to form connections. The connected nodes are used to designate interpreted horizons, which are then validated in 3D to avoid any unwanted features, e.g., superposition of seismic events in a single patch. There are several methods that could be used to accomplish this validation. FIG. 3B shows the 2D view of the validated patches overlaid on the selected seismic section. Note that very small patches (less than 5 nodes) have been excluded from the display.

The use of an initial depositional rate model is optional but is especially beneficial when geologic structures of interest are complex. FIG. 3C shows one option to automatically create an initial model. First a dip magnitude and azimuth are calculated from the seismic data and used to approximate a three-dimensional stream function by assuming that the dip vectors represent a flow field through the seismic data. An initial depositional rate can then be obtained by calculating the vertical derivative of the stream function.

FIG. 3D shows a first-pass, contour plot of the obtained geological age model. There are a total of approximately 3,300 patches, and approximately 63,000 vertical links and 1,000 horizontal links defined among patches. The weighting of the links is balanced by the inverse of depositional rate. In this example no linear constraint has been added. The age values of the patches can be solved via a matrix inverse, and then interpolated to give a fully sample 2D section. For example, the age values of the patches are firstly solved by the least square solution, and then interpolated by a 2D linear operator to give a fully sampled 2D age section. The contours of the first-pass solution in general show a very good consistency with the seismic data. The overall structure of the clinoforms and parallel seismic events are clearly shown in the age section. The bottom-right age section shows disagreement, which is mainly limited by the lack of patches and the presence of a major normal fault.

FIG. 3D illustrates a contour plot wherein the ages of patches are discrete measurements. In the contour plot of FIG. 3D, each line represents a single age and similar lines represent an interval of an age range. For example, each of the solid lines represent a single age and all three of the solid lines represent an age interval.

The age model can be iteratively improved by an interactive updating of links and patches to complete the patches to horizons. The entire process can be purely automatic, with choosing appropriate parameters to run the program. The computation time of solving the age in 3D for this example took about 15 seconds, on a mobile workstation ($8^{th}$ Generation Intel i7 processor with 16 Gb RAM). The preparation of onsets, patches and initial models can take 5 to 30 minutes, depending on the choice of methods, and the size of the dataset. As such, the disclosure provides an efficient solution to construct a 3D age model from seismic data.

Figure 4:
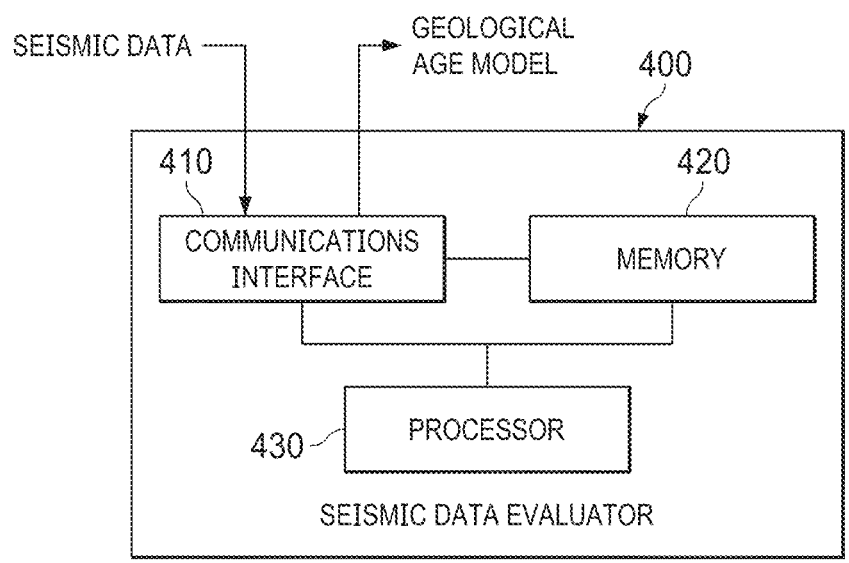
FIG. 4 illustrates a block diagram of an example of a seismic data evaluator constructed according to the principles of the disclosure.

FIG. 4 illustrates a block diagram of an example of a seismic data evaluator 400 constructed according to the principles of the disclosure. The seismic data evaluator 400 can be a computing device. The seismic data evaluator 400 includes at least one interface 410 for receiving and transmitting information, at least one memory 420 for storing data and computer programs, and at least one processor 430 for performing functions when directed by the computer programs. For example, the memory 420 can store code corresponding to algorithms representing at least some of the steps of the workflow 100, that direct the processor 430 to automatically generate a geological age model from a pre-interpreted suite of patches by abstracting seismic data of a subsurface into a limited number of patches, abstracting the patches by defining links between the patches, and generating a geological age model of the subsurface by solving for the relative geological age of the patches, for example for each of the patches, using the links. The algorithms can correspond to one or more, including all, of the equations disclosed herein. Other similar methods or portions of other similar methods can also be used to direct the processor 430 to perform similar functions.

The interface 410 is a communications interface that includes the necessary hardware, software, or combination thereof to communicate, i.e., receive and transmit, data. The interface 410 can be a conventional interface. As illustrated, the interface can receive seismic data for processing. The seismic data can be 3D (three dimensional) data. The seismic data may also be 2D or 4D. The interface 410 also transmits a geological age model provided by the processor 430. The geological age model can be sent to a display for visual presentation, which can be used for manual interpretation. The geological age model can also be presented to another processor or computing system for additional processing and or analysis, such as automated analysis. The resulting geological age model can be, for example, used in a well operation, such as a drilling operation, wherein the output is used to identify the drilling location and drilling is performed at the location.

The memory 420 can be a conventional memory or data storage. The processor 430 can be one or more processors, including a CPU, a GPU, or a combination thereof.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magnetooptical media such as floppy disks; and hardware devices that are specially configured to store and execute program code, such as ROM and RAM devices. Configured means, for example, designed, constructed, or programmed, with the necessary logic and/or features for performing a task or tasks. A configured device, therefore, is capable of performing the task or tasks. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:
A. An automated method of generating a geological age model for a subterranean area. In one example, the automated method includes: (1) abstracting seismic data of a subsurface into a limited number of patches, (2) abstracting the patches by defining patch-links between the patches, and (3) generating a geological age model of the subsurface by solving for the relative geological age of each of the patches using the patch-links.
B. A computer program product having a series of operating instructions stored on a non-transitory computer-readable medium that directs a data processing apparatus when executed thereby to perform operations to generate a geological age model from a pre-interpreted suite of patches. In one example the operations include: (1) abstracting seismic data of a subsurface into a limited number of patches, (2) abstracting the patches by defining patch-links between the patches, and (3) generating a geological age model of the subsurface by solving for the relative geological age of each of the patches using the patch-links.
C. An apparatus comprising at least one processor and memory, the memory including computer program code, the memory and the computer program code configured to, with the at least one processor, cause the apparatus to automatically generate a geological age model from a pre-interpreted suite of patches by performing at least the following: (1) abstracting seismic data of a subsurface into a limited number of patches, (2) abstracting the patches by defining patch-links between the patches, and (3) generating a geological age model of the subsurface by solving for the relative geological age of each of the patches using the patch-links.

Each of the aspects disclosed aspects A, B, and C can have one or more of the following additional elements in combination. Element 1: wherein the defining the patch-links includes defining spatial relationships between the patches. Element 2: wherein the spatial relationships are differences in depth. Element 3: wherein the geological and spatial relationships are defined according to an inverse of the depositional rate between the patches. Element 4: wherein defining the patch-links includes applying a weighting factor to the inverse of depositional rate. Element 5: wherein solving for the relative geological age of the patches includes iteratively solving an equation representing the inverse of the depositional rate between the patches. Element 6: wherein iteratively solving the equation includes assuming a starting model for the inverse of the depositional rate. Element 7: wherein iteratively solving the equation includes assuming a starting model for the age of each patch. Element 8: wherein defining the patch-links includes using constraints. Element 9: wherein the constraints are fixed age constraints. Element 10: wherein the constraints are soft constraints associated with an age equivalence of the patches. Element 11: wherein the constraints are hard constraints associated with an age equivalence of the patches. Element 12: wherein the constraints include one or more of extrapolation between patches and intersections, dynamic time-warping, and horizon tracking using a convolutional neural network. Element 13: wherein generating the geological age model includes using a smoothing constraint. Element 14: wherein generating the geological age model includes balancing contribution of depositional rates by applying a weighting matrix. Element 15: wherein generating the geological age model includes using a least square solution and linear constraints.

What is claimed is:

1. An automated method of generating a geological age model for a subterranean area, comprising:
abstracting seismic data of a subsurface into a limited number of patches;
abstracting the patches by defining patch-links between the patches;
setting-up a system of equations wherein the number of equations in the system of equations is equal to the number of patch-links;
calculating a set of depositional rates using the system of equations, wherein each depositional rate in the set of depositional rates is calculated between two patches of the limited number of patches, for one patch-link between the two patches, by a total of a depth to a first patch of the two patches minus the depth to a second patch of the two patches, then divided by a total of an age of the first patch minus the age of the second patch;
generating a geological age model of the subsurface by solving for the relative geological age of each of the patches using the patch-links and an inverse of the depositional rate between each of the patches in the set of depositional rates, wherein the inverse of the depositional rate is one divided by the depositional rate; and
performing a drilling operation at a location identified using the geological age model.

2. The method as recited in claim 1, wherein the defining the patch-links includes defining spatial relationships between the patches.

3. The method as recited in claim 2, wherein the spatial relationships are differences in depth.

4. The method as recited in claim 2, wherein the spatial relationships are defined according to an inverse of the depositional rate between the patches.

5. The method as recited in claim 4, wherein defining the patch-links includes applying a weighting factor to the inverse of the depositional rate.

6. The method as recited in claim 4, wherein solving for the relative geological age of the patches includes iteratively solving an equation representing the inverse of the depositional rate between the patches.

7. The method as recited in claim 6, wherein iteratively solving the equation includes assuming a starting model for the inverse of the depositional rate.

8. The method as recited in claim 6, wherein iteratively solving the equation includes assuming a starting model for the age of each patch.

9. The method as recited in claim 1, wherein defining the patch-links includes using constraints.

10. The method as recited in claim 9, wherein the constraints are fixed age constraints.

11. The method as recited in claim 9, wherein the constraints are soft constraints associated with an age equivalence of the patches.

12. The method as recited in claim 9, wherein the constraints are hard constraints associated with an age equivalence of the patches.

13. The method as recited in claim 9, wherein the constraints include one or more of extrapolation between patches and intersections, dynamic time-warping, and horizon tracking using a convolutional neural network.

14. The method as recited in claim 1, wherein generating the geological age model includes using a smoothing constraint.

15. The method as recited in claim 1, wherein generating the geological age model includes balancing contribution of depositional rates by applying a weighting matrix.

16. The method as recited in claim 1, wherein generating the geological age model includes using a least square solution and linear constraints.

17. A computer program product having a series of operating instructions stored on a non-transitory computer-readable medium that directs a data processing apparatus when executed thereby to perform operations to generate a geological age model from a pre-interpreted suite of patches, the operations comprising:
  abstracting seismic data of a subsurface into a limited number of patches;
  abstracting the patches by defining patch-links between the patches;
    setting-up a system of equations wherein the number of equations in the system of equations is equal to the number of patch-links;
  calculating a set of depositional rates using the system of equations, wherein each depositional rate in the set of depositional rates is calculated between two patches of the limited number of patches, for one patch-link between the two patches, by a total of a depth to a first patch of the two patches minus the depth to a second patch of the two patches, then divided by a total of an age of the first patch minus the age of the second patch;
  generating a geological age model of the subsurface by solving for the relative geological age of each of the patches using the patch-links and an inverse of the depositional rate between each of the patches in the set of depositional rates, wherein the inverse of the depositional rate is one divided by the depositional rate; and
  directing the performance of a drilling operation at a location identified using the geological age model.

18. The computer program product as recited in claim 17, wherein the defining the patch-links includes defining spatial relationships between the patches.

19. An apparatus comprising at least one processor and memory, the memory including computer program code, the memory and the computer program code configured to, with the at least one processor, cause the apparatus to automatically generate a geological age model from a pre-interpreted suite of patches by performing at least the following:
  abstracting seismic data of a subsurface into a limited number of patches;
  abstracting the patches by defining patch-links between the patches;
    setting-up a system of equations wherein the number of equations in the system of equations is equal to the number of patch-links;
  calculating a set of depositional rates using the system of equations, wherein each depositional rate in the set of depositional rates is calculated between two patches of the limited number of patches, for one patch-link between the two patches, by a total of a depth to a first patch of the two patches minus the depth to a second patch of the two patches, then divided by a total of an age of the first patch minus the age of the second patch;
  generating a geological age model of the subsurface by solving for the relative geological age of each of the patches using the patch-links, wherein a geological and a spatial relationship is defined according to an inverse of the depositional rate between the patches, wherein the inverse of the depositional rate is one divided by the depositional rate; and
  performing a drilling operation at a location identified using the geological age model.

20. The apparatus as recited in claim 19, wherein the defining the patch-links includes defining spatial relationships between the patches according to an inverse of the depositional rate between the patches, and wherein the spatial relationships are differences in depth between the patches.

* * * * *